United States Patent
Buchholt et al.

(12)

(10) Patent No.: US 6,261,626 B1
(45) Date of Patent: Jul. 17, 2001

(54) METHODS OF OBTAINING SELECTED PECTIN FRACTIONS, SUCH FRACTIONS AND THEIR USE

(75) Inventors: Hans Christian Buchholt, Brabrand; Peter Fromholt Larsen, Hoejbjerg, both of (DK)

(73) Assignee: Danisco A/S, Copenhagen (DK)

( * ) Notice: Subject to any disclaimer, the term of this patent is extended or adjusted under 35 U.S.C. 154(b) by 0 days.

(21) Appl. No.: 09/091,733

(22) PCT Filed: Jun. 18, 1998

(86) PCT No.: PCT/DK98/00259

§ 371 Date: Jun. 24, 1998

§ 102(e) Date: Jun. 24, 1998

(87) PCT Pub. No.: WO98/58968

PCT Pub. Date: Dec. 30, 1998

Related U.S. Application Data

(60) Provisional application No. 60/050,732, filed on Jun. 25, 1997, and provisional application No. 60/072,717, filed on Jan. 27, 1998.

(30) Foreign Application Priority Data

Jun. 23, 1997 (DK) .................................................. 0741/97
Jan. 26, 1998 (DK) .................................................. 0120/98

(51) Int. Cl.[7] ........................................................ A23L 1/05
(52) U.S. Cl. ......................... 426/577; 426/573; 426/580; 426/583
(58) Field of Search .................................. 426/577, 573, 426/580, 582, 583

(56) References Cited

U.S. PATENT DOCUMENTS 2,020,572   11/1935   Platt ......................................... 99/11
3,761,463   9/1973   Haung ................................. 260/209.5

FOREIGN PATENT DOCUMENTS

| 1106821 | 8/1995 | (CN) . |
| 466356 | 5/1937 | (GB) . |
| 61-076501 | 4/1986 | (JP) . |
| 03201943 | 9/1991 | (JP) . |

OTHER PUBLICATIONS

Patent Abstracts of Japan, vol. 10, No. 245 (C–368), Aug. 22, 1986 & JP 61 076503 A (Mitsubishi Acetate), Apr. 19, 1986, see abstract.

Database WPI, Week 8217, Derwent Publications Ltd., London, GB; AN 34732E, XP002078539 & SU 840 043 B (As Mold Chem Inst), Jun. 25, 1981, see abstract.

"Fractionation of Citrus Pectin on Diethylaminoethyl–cellulose Columns" by Sohair A. El–Nawawi, et al, Process Biochemistry, vol. 32, No. 5, pp. 377–379, 1997.

*Primary Examiner*—Leslie Wong
(74) *Attorney, Agent, or Firm*—Hunton & Williams

(57) ABSTRACT

A method of providing selected fractions of high-esterified pectin, each having different functionalities, by consecutive extraction of a vegetable material with acidic aqueous solutions to obtain successive fractions of high-esterified pectin with increasing setting time. The vegetable material is optionally prior to being extracted subjected to an acid pre-treatment by heating it in a homogeneous mixture of water and a water-miscible organic solvent. The pectin fractions obtainable by the method have improved properties when used in the preparation of food products such as preserves and acidified milk products. The pectin fractions are also useful as starting materials in a method of obtaining deesterified and optionally amidated pectin fractions having additionally improved functional characteristics.

51 Claims, No Drawings

METHODS OF OBTAINING SELECTED PECTIN FRACTIONS, SUCH FRACTIONS AND THEIR USE

This is a National Stage application of PCT/DK98/00259, filed Jun. 18, 1998. This application is also based upon provisional applications U.S. Ser. No. 60/050,732, filed Jun. 25, 1997 and U.S. Ser. No. 60/072,717, filed Jan. 27, 1998.

FIELD OF THE INVENTION

The present invention relates to a method of obtaining selected fractions of pectin, comprising consecutive acid extraction of a pectin-containing vegetable material to obtain successive fractions of high-esterified pectin with increasing setting time and to the use of pectin fractions obtainable by the method in the preparation of food products. Such pectin fractions are also useful as starting materials for the preparation of deesterified pectin fractions having additionally improved functional characteristics.

BACKGROUND OF THE INVENTION

Pectin is a heteropolysaccharide which is found in the form of a water insoluble parent pectic substance—protopectin—in the primary cell wall and the middle lamella of green land plants. Pectin is the generic designation for compounds which result from restricted hydrolysis of protopectin.

The exact nature of protopectin is not completely understood. It is, however, generally recognised that protopectin is a complex structure in which pectin is attached to other cell wall components, such as cellulose and hemicellulose, by covalent bonds, hydrogen bonds and/or ionic interactions.

Pectin is a linear polymer composed of D-galactopyranosyl uronic acid units which are linked through α-1.4-glycosidic bonds forming long chains of polygalacturonic acid. Part of the carboxyl groups of the uronic acid units are esterified with methanol. In the plants the residual carboxyl groups are partly or completely neutralised with cations of calcium and magnesium which inherently are contained in the plant tissues.

The heteropolysaccharide nature of pectin derives from the fact that other sugars are incorporated in the pectin molecule. The most common sugars are L-rhamnose, inserted by α-1.2-linkages in the galacturonan backbone, and β-D-xylose, attached as single-unit side chains mainly to O-3 of the galactopyranosyl uronic acid residues in the backbone, and D-galactose and L-arabinose, which occur in long side chains, only attached to rhamnopyranosyl residues.

Major sources of commercial pectin products are citrus peel and apple pomace in which protopectin represents 10–40% by weight of the dry matter.

Pectin in isolated and more or less purified form is mostly obtained from the plant material by treating the material with an acid or base under suitable conditions whereby the protopectin is split, followed by extraction of the water soluble pectin. In conventional industrial production of pectin, acid or base treated pectin-containing plant starting material is subjected to extraction with dilute acid which step is followed by separating the depectinated plant material by e.g. filtration or centrifugation to obtain a viscous extract containing up to 1% by weight of soluble pectin. This extract may be purified and processed further. Finally, the pectin is precipitated, separated and dried to obtain a commercial pectin product which is at least partially purified.

The hydrolysis of the polygalacturonic acid methyl esters occurs at both acidic and alkaline pH values, but dominates at pH values above 7, in particular above 9. The polygalacturonic acid methyl ester groups are also hydrolysed by pectin esterases of plant origin. Pectin esterases are present in plant materials such as citrus fruits. Contrary to chemical hydrolysis which attacks the polygalacturonic acid methyl ester groups at random, the pectin esterases attack next to a free carboxyl group and proceed along the backbone thus creating a blockwise or non-random distribution of free carboxyl groups.

For water soluble pectin resulting from hydrolysis of protopectin average values of 100,000 to 200,000 for the molecular mass have been measured.

In the course of time, several methods of extracting pectic substances from vegetable matter, such as i.a. citrus peel, apple pomace or beet pulp have been described. These known processes aim at extracting substantially all of the pectin content of the pectin-containing starting material.

Thus, as one example U.S. Pat. No. 2,008,999 discloses a method of producing pectin comprising subjecting a pectin-containing material to an extraction at a pH of from 0.7 to 2.2 with a solution of a strong inorganic acid at a temperature of from 50 to 75° C. until the pectin in a test sample is precipitable by calcium ions at a pH of from 3 to 7, filtering the extraction mixture and recovering the pectin from the filtrate which has been brought to a pH of 3–7.

U.S. Pat. No. 2,273,521 describes a process which comprises treating a pectin-containing material with a solution of a solvent in which pectin is insoluble and an inorganic or organic acid at a temperature of about 70° C. and separating the extraction residue containing the water-soluble pectin. The pectin is recovered from the residue by extraction with water and isolated in solid form from the extract.

Other processes of preparing bulk-extracted pectin are disclosed in U.S. Pat. No. 2,586,407, EP 688,792-A, U.S. Pat. No. 4,016,351 and U.S. Pat. No. 2,020,572.

Thus, the prior art describes methods of producing isolated pectin wherein a pectin-containing material is subjected to an exhaustive, i.e. a substantially complete extraction and the pectin is recovered as a whole, i.e. the pectin is provided as bulk-extracted pectin. Depending on the processing conditions including pH, temperature and time of extraction it is, to some extent, possible to control such bulk extraction processes so that pectins having different degrees of esterification are obtained.

However, the characteristics of such extracted pectin products can be defined only in a statistical manner because of the variability in polymerisation, methoxylation and acetylation, neutral sugar content, and distribution of substituents along the backbone. It is reasonable to assume that not two pectin molecules in a bulk-extracted pectin preparation are identical. Thus, the chemical and physical properties of a single pectin molecule are determined i.a. by the molecular mass of the molecule and the concentration and distribution of free and esterified carboxyl groups in the molecule as well as the concentration and the distribution of other groups in the molecule. Thus, two pectin molecules having the same molecular mass and the same esterification may interact differently with another molecule, particle or ion.

The degree of esterification (DE) of the pectic substances is of considerable significance for the food additive effects of pectin containing products. Typically, pectin-containing products have a DE which is in the range of 10–90%. In particular foods it may be advantageous to use pectin having a high DE, e.g. more than 50%.

High-esterified bulk pectin which has been extracted under conditions selected so as to obtain bulk-extracted pectin preparations having specific functional properties often exhibits an undesired performance such as giving rise to a haze in gels, enhanced viscosity resulting in pregelation, incomplete solubility, and syneresis in milk systems, such as yoghurt.

This undesired performance which is observed with bulk-extracted pectin is attributed to the molecular variability and a varied interaction between calcium ions and separate pectin molecules having varying affinity towards calcium ions and other charged particles such as for example proteins.

Bulk-extracted pectin products comprise molecules that represent a broad distribution of methoxylation degree and molecules of non-random as well as random methoxylation pattern. This affects the important quality parameters for pectin, such as setting time, breaking strength of gels, setting temperature profile and solubility of pectin in food manufacturing applications.

An important objective of the present invention is therefore to provide a method for preparing separate fractions of high-esterified pectin having improved functional characteristics over bulk-extracted pectin.

However, it has surprisingly been found that such selected pectin fractions are also very suitable starting materials for making derivatized pectin fractions having exceptionally good functional characteristics. Thus, by subjecting the high-esterified pectin fractions according to the invention to treatment with an acid and/or ammonia under deesterifying conditions, deesterified and optionally amidated pectin fractions can be obtained which are useful as additives in various food applications such as for example fruit preparations and dairy products. It has been found, that such deesterified pectin fractions have improved functional characteristics both in comparison with the high-esterified pectin starting material and similarly treated bulk-extracted pectin.

SUMMARY OF THE INVENTION

Accordingly, the present invention provides in a first aspect a method of obtaining selected pectin fractions having successively increasing setting times, the method comprising subjecting a starting material containing high-esterified pectin to a first treatment cycle comprising a step of extracting the starting material with an aqueous extraction medium at an acidic pH under conditions where only part of the pectin content is extracted, separating the pectin extract from the treated starting material and recovering the pectin from the extract to obtain a first pectin fraction, followed by at least one further treatment cycle whereby the treated starting material extracted in the preceding cycle is treated to obtain a second and optionally one or more further pectin fractions, the pH of the extraction medium in each of the second and further cycles being lower than in the immediately preceding treatment cycle.

In further aspects, the present invention relates to a selected pectin fraction obtainable by the above method, the fraction having a degree of esterification which is at least 50% and a setting time which is the range of 0 to 100 sec, 101 to 200 sec, 201 to 300 sec or in excess of 300 sec, the setting time being determined by the method of Joseph and Bair (Food Technology, 1949, 18, 18–22) in terms of the time required for obtaining complete gelling of a hot standardized pectin-sugar-water solution at pH 2.1 to 2.5 when cooled at constant temperature of 30° C. and to the use of such high-esterified pectin fractions in the preparation of a food product.

In a still further aspect, the invention pertains to a method of stabilizing an acidified milk product comprising adding to the milk product an amount of a pectin fraction as defined above, the addition of the fraction resulting in an improvement of the milk product, the improvement is selected from the group consisting of at least 10% reduction in viscosity, at least 10% smaller particles and at least 10% less sediment, as compared to the addition of the same amount of a bulk-extracted pectin product.

The method of the present invention for obtaining selected high-esterified pectin fractions involves significant advantages over prior art bulk extraction of pectin by providing selected and separate fractions of high-esterified pectin each having a narrow distribution in methoxylation degree and each having particular functionalities. Thus, the fractions successively obtained by the process according to the invention have successively increasing setting times.

A significant aspect of the present invention is that it provides the means of obtaining fractions of the entire pectin content of the starting material each of which has specific functional characteristics e.g. with respect to gelling properties including the setting time as defined herein. By selecting appropriate extraction conditions in the individual process cycles it is possible to obtain pectin fractions specifically suitable for a specific purpose. It is also evident that the individual pectin fractions can be combined to form composite pectin products having, relative to the original individually prepared fractions, intermediate functional characteristics.

In food applications, such as in the manufacturing of preserves and milk products, e.g. jam, jellies, drinking yoghurt and yoghurt with fruit, or fruit or vegetable juices, the high-esterified pectin fractions provided by the above method of the present invention are superior to bulk-extracted pectin as a result of an enhanced functional specificity, that is to say the concentration of pectin having a specific functionality is increased in the pectin fraction.

The above high-esterified pectin fractions of the invention are, as it is mentioned above, useful as starting materials in a method of obtaining deesterified pectin fractions having further improved functional characteristics.

Thus, in other aspects, the invention pertains to a method of obtaining a deesterified pectin fraction, comprising subjecting a selected pectin fraction obtainable by above method and having a degree of esterification which is 50% or higher, to at least one deesterification treatment step comprising reacting the high-esterified pectin fraction with a deesterifying agent to obtain a pectin fraction having a degree of esterification (DE) which is reduced by at least 5% relative to that of the high-esterified pectin fraction and a degree of amidation (DA) which is in the range of 0–25, such as in the range of 5 to 25, and to a deesterified pectin fraction obtainable by this method, which fraction has a degree of esterification which is less than 50% and a degree of amidation which is in the range of 0 to 25, including the range of 5 to 25, and to the use of such a deesterified pectin fraction in the preparation of a food product.

DETAILED DISCLOSURE OF THE INVENTION

Thus, in a first aspect, the present invention provides a method of selectively fractionating pectin, comprising consecutive extraction of a pectin-containing starting material with aqueous media or solutions at an acidic pH which is preferably at the most 4, such as a pH in the range of 1 to 4, e.g. in the range of 1 to 3 to obtain successive extracts of soluble pectin containing high-esterified pectin of successively increasing setting time, and recovering the pectin from said extracts.

In the present context, the term "consecutive extraction" is used to indicate a series of repeated treatment cycles involving repeated steps of extractions of a pectin-containing material wherein a pectin-containing vegetable material or a pectin-containing extraction residue resulting from the preceding extraction after separation of the extract and optionally washing liquids is subjected to extraction in a subsequent extraction step.

As used herein, the term "extraction residue" refers to the undissolved material which is retained after the liquid extract has been separated from the extraction mixture.

In the present context, the term "high-esterified pectin" indicates pectin having a DE which is at least 50%, e.g. at least 55%. Interesting high-esterified pectins may have an even higher DE such as at least 60% or at least 70%.

In the present context, the term "setting time" refers to the well-known standard method according to Joseph and Bair (Food Technology, 1949, 18, 18–22) for determining the time required for obtaining complete gelling of a hot standardised pectin-sugar-water solution of pH 2.1–2.5 when cooled at a constant temperature of 30° C.

In accordance with the present invention, useful starting materials for the consecutive extraction are pectin-containing materials derived from native vegetable materials in a fresh or dried state. Such suitable native materials include peel, pulp and/or rag from citrus fruits such as lemon, orange, citron, mandarin, lime, grapefruit, tangerine, bergamot and shaddock, and varieties and hybrids of several of these. Suitable native materials which also can be used in the present invention include apple pomace, pear pomace, sugar beet pulp, potato peel and carrot fibre.

Particularly interesting starting materials include dried peel from citrus fruits, having a dry matter content of about 90% by weight or more, preferably in the form of pieces of at the most 2 cm in length, which is obtained from the juice industry after extraction of the citrus juice and the essential oils. These materials all have a high content of pectic substances in the form of water-insoluble protopectin. Citrus peel having a content of pectin in the range of 30–35 wt % or more on a dry matter basis is particularly interesting.

The method according to the invention is carried out as a series of separate, batchwise process cycles, each cycle comprising a step of extracting the pectin-containing material to obtain an extract containing pectin, and a step of recovering the pectin from the extract.

According to the invention, the pectin-containing material as defined above is understood to include the solid extraction residue arising from a preceding extraction step.

Thus, according to the present invention the method comprises at least two extraction and pectin recovery cycles, e.g. at least three extraction steps, each followed by a step of recovering the extracted pectin.

In accordance with the invention, the extraction comprises heating an acid aqueous suspension of the pectin-containing material to be extracted at a temperature in the range of 40 to 100° C. for a period of from 1 to 20 hours. The extractions are preferably carried out at a temperature in the range of from 60° C. to 80° C. for a period of from 1 to 10 hours such as for a period of from 1 to 5 hours at a temperature in the range of from 60° C. to 80° C.

The amount of extraction medium to be used in each extraction step depends i.a. on the origin and the condition of the pectin-containing material to be extracted, and the content of extractable pectin in the material.

In accordance with the invention, the amount of pectin-containing material and extraction medium in each extraction step, which is carried out while gently stirring the suspension of pectin-containing material, is chosen so that the suspension has a dry matter content which is in the range of from 1% to 5% by weight, e.g. in the range of from 2% to 4% by weight.

By using the mentioned amounts of extracting liquid there is obtained a suspension which is easy to stir and there is obtained pectin extracts which are not too viscous.

The acidity of the suspension is adjusted to an acidic pH value which is e.g. at the most 4, such as in the range of from 1 to 4 including the range of 1 to 3, by the addition of an organic or an inorganic acid, or a base. Useful acids include strong inorganic acids as exemplified by, but not limited to, hydrochloric acid, sulphuric acid, nitric acid or phosphoric acid. Useful bases include ammonia and alkaline metal hydroxides such as sodium hydroxide or potassium hydroxide, or alkaline metal carbonates, such as sodium carbonate or potassium carbonate. It will be understood that mixtures of acids or mixtures of bases also may be used in adjusting the pH of the suspension.

The extraction parameters are set to obtain fractions containing high-esterified pectin having a narrow distribution in molecular weight and esterification and various other parameters that give more uniform fractions of pectin with more specific functionality. This can be performed by adjusting the extraction temperature, the period of extraction and/or the pH during the extraction. However, variations in the extraction temperature and the time of extraction affects the quality of the pectin. Therefore, the pH is a preferred parameter to use in order to control the consecutive extraction.

Thus, by taking advantage of the different solubility and chelating ability of the pectin molecules with metal ions including calcium and/or magnesium ions inherently present in the pectin containing material to be extracted, extractions at decreasing pH values result in a high selectivity of the consecutive extraction steps and there is obtained successive fractions containing pectin of increasing setting time.

In accordance with the present invention, each extraction step following the first one is carried out at a pH value which is lower than the pH value in the immediately preceding extraction step.

During their experimentation, the present inventors have found that the presence of metal ions, in particular calcium and/or aluminum ions, in the aqueous extraction liquid enhances the selectivity of the fractionation significantly.

Accordingly, in a preferred embodiment of the invention the aqueous extraction medium contains an added water soluble metal salt such as calcium and/or aluminum salts including as examples calcium chloride, calcium nitrate, calcium acetate, aluminum chloride, and aluminum sulfate. These salts of calcium and/or aluminum are suitably added in such an amount that the metal ion concentration in the extraction liquid is in the range of from 1 to 100 mmol such as in the range of from 10 mmol to 40 mmol per liter extraction liquid. In each extraction step, the metal ion concentration in the extraction liquid may be the same or it may be different.

After a suitable time of extraction, the extraction mixture is cooled and the liquid is separated from the solid extraction residue, e.g. by filtration or draining. After filtration or draining, the extraction residue still contains a large amount of aqueous phase containing extracted pectin. Optionally, the solid extraction residue is washed with water on the filter or the residue is resuspended in water and filtered again to remove as much as possible of the pectin-containing aqueous phase. After separation of the washing liquid from the solid extraction residue the washing liquid is combined with the extract. If still containing high-methoxylated pectin, the extraction residue is subjected to a further extraction.

The extracted pectin may be recovered from the individual extracts by any convenient method.

In case a high yield of pectin with less functional specificity is required, it may be expedient to combine the extracts from an extraction step and a succeeding one and recover the pectin from the thus combined extract.

The pectin can be precipitated from the extract by addition of the extract, which optionally has been concentrated for example by membrane filtration or by evaporation under reduced pressure, to a water-miscible organic solvent. The organic solvent used to precipitate the pectin may be any solvent which is water-miscible and in which pectin is substantially insoluble.

The solvent may be a monohydric alcohol, for example methanol, ethanol, isopropanol, tert-butanol, sec-butanol, n-butanol, tert-amyl alcohol, neopentyl alcohol, sec-amyl alcohol or diethylcarbinol; a dihydric alcohol, for example ethylene glycol, propylene glycol or tetramethylene glycol; a ketone, for example acetone, methyl ethyl ketone, methyl isobutyl ketone or methyl tert-butyl ketone; or a glycol ether, for example diethylene glycol monomethylether, ethylene glycol monoethylether, diethylene glycol monomethylether or triethylene glycol dimethylether. Mixtures of two or more of such solvents may also be used in the precipitation of the pectin.

The precipitated pectin is separated from the liquid by any convenient method, such as for example by filtration, and the precipitate is pressed and washed on the filter to remove soluble salts and impurities. Finally, the pectin is dried and optionally ground.

In one preferred embodiment, the pectin may also be recovered from the individual extracts by adjusting the pH of the extracts to a level in the range of 1 to 5 such as in the range of 2 to 2.5 by addition of an acid, e.g. hydrochloric acid, or a base, such as for example ammonia, followed by addition of a strongly acidic cation exchanger in salt form to raise the pH to a level in the range of 2.5 to 3.5 and stirring the mixture at ambient temperature for 4 to 8 hours. After having separated the liquid from the ion exchanger resin, the pectin is recovered from the liquid by precipitation with a water miscible organic solvent as described above.

According to the invention, the pectin-containing starting material may be a pectin-containing material which optionally, prior to being extracted, is subjected to a pre-treatment.

Thus, in a useful embodiment of the invention the pectin-containing starting material for the consecutive extraction is a native material as defined above which has been subjected to a pre-treatment with an acid whereby at least part of the protopectin contained in the material is converted to water soluble pectic substances under such conditions that the water soluble pectic substances being formed remain in a non-dissolved state in aggregation with insoluble plant cell constituents such as cellulose and hemicellulose, and whereby at least part of non-pectinaceous substances such as for example proteins, sugars, colouring matter and salts are removed.

According to the invention, such a pre-treatment comprises heating a suspension of the pectin-containing material at a temperature of from 60° C. to 80° C. in a substantially homogeneous solvent mixture comprising water and at least one solvent in which pectin is substantially insoluble to which an acid is added to maintain a fixed pH of the suspension within the range of from 1 to 3 during the treatment and subsequently separating the pre-treated pectin-containing material. The separated pre-treated material is subjected to at least one washing treatment and is finally dried and, if desired, comminuted to particles of a length of at the most 2 cm.

A suitable amount of pectin-containing material dry matter in the pre-treatment suspension is in the range of from 5% to 15% by weight, preferably from 5% to 10% by weight.

The solvent used in the pre-treatment and/or in any washing treatment of the pre-treated material subsequent to the pre-treatment may be any solvent in which pectin is substantially insoluble since the pre-treatment implies that the pectin remains undissolved during the pre-treatment. In addition, the solvent should be miscible with water so as to enable a homogeneous mixture to be prepared and maintained without the use of excessive agitation.

The same solvent may be used in the homogeneous solvent mixture and for any subsequent washing treatment, or one solvent may be used in the pre-treatment and another solvent or optionally more than one solvent or a mixture of two or more solvents may be used for the washing treatments.

The solvent may be a monohydric alcohol, for example methanol, ethanol, isopropanol, tert-butanol, sec-butanol, n-butanol, tert-amyl alcohol, neopentyl alcohol, sec-amyl alcohol or diethylcarbinol; a dihydric alcohol, for example ethylene glycol, propylene glycol or tetramethylene glycol; a ketone, for example acetone, methyl ethyl ketone, methyl isobutyl ketone or methyl tert-butyl ketone; or a glycol ether, for example diethylene glycol monomethylether, ethylene glycol monoethylether, diethylene glycol monomethylether or triethylene glycol dimethylether.

The weight ratio between solvent or solvent mixture and water in the pre-treatment mixture is suitably from 40:60 to 80:20 such as from 50:50 to 70:30. When "water" is referred to in connection with the ratio between solvent and water in the reaction mixture, the amount of water is the sum of added water and the water present in the pectin-containing starting material.

In accordance with the invention, the pre-treatment of the pectin-containing material is carried out for a period of from 2 to 6 hours e.g. from 3 to 4 hours.

Useful acids in the pre-treatment include organic acids and inorganic acids such as an inorganic acid selected from the group consisting of sulphuric acid, hydrochloric acid, phosphoric acid and nitric acid. Among these acids, nitric acid and hydrochloric acid are presently considered to be particularly useful.

The drying step is carried out by means of any conventional drying equipment such as a drying oven, a band dryer, a drum dryer or a fluid bed dryer for a period of time sufficient to obtain a dry matter content in the material of at least 80% by weight, preferably at least 90; by weight. The drying is carried out at a temperature ranging from ambient temperature to about 100° C., preferably at a temperature in the range of from 40° C. to 100° C. , for a period of at most 36 hours. It may be preferred to carry out the drying at pressures below atmospheric pressures, whereby a relatively lower drying temperature or a comparatively shorter drying period can be used resulting in a more gentle treatment.

In food applications the high-esterified pectin fractions provided by the method of the present invention have, as it is mentioned above, significant advantages over pectin products provided by bulk extraction.

With respect to functionality characteristics of such selected pectin fractions, the setting time as defined above is a significant parameter. In accordance with the method of the invention, pectin fractions can be obtained which e.g. have a setting time in the range of 0 to 100 sec, 101 to 200 sec, 201 to 300 sec or in excess of 300 sec, respectively.

In one aspect, the present invention relates to the use of high-esterified pectin fractions obtainable by the method for preparing such fractions of the present invention in the preparation of a food product.

In presently preferred embodiments of the invention, the food product in whose preparation the high-esterified pectin fractions are useful is selected from the group consisting of acidified milk products e.g. having a pH of 3.5 to 4.5, such as drinking yoghurt and yoghurt with fruit, and preserves, such as jam and jellies, and fruit or vegetable juices.

The above acidified milk products comprise milk products obtained by acidification either through fermentation with live acid producing bacteria or by addition of fruit juices or food acids.

During the acidification of the milk, pH passes the isoelectric pH value of caseins and the net charge becomes positive. A three-dimensional casein network is created and the milk is turned into a gel. Stirring of the milk gel breaks down the structure and the acidified milk becomes liquid. However, the positive net charge on the surface of the caseins cannot sufficiently prevent the agglomeration of the caseins and the acidified milk will therefore be physical unstable in regard to sedimentation and whey separation. Addition of a high-esterified pectin provided by the method of the present invention will prevent these undesired physical changes in the acidified milk drink in a more effective way than does a bulk-extracted pectin.

Thus, it was found that addition of a pectin fraction according to the invention to drinking youghurt resulted in an improvement of this milk product, including at least 10% reduction in viscosity, at least 50% smaller particles or at least 10% less sediment, as compared to the addition of the same amount of a bulk-extracted pectin product. More specifically it was found that the addition of a pectin fraction as provided herein and having a setting time in the range of 100 to 200 sec to drinking yoghurt in comparison with the addition of the same amount of a commercial bulk-extracted pectin product also having a setting time in the range of 100 to 200 sec resulted in a significant reduction in viscosity such as at least 2 times reduction ($\leqq 50\%$), e.g. at least 5 times reduction ($\leqq 20\%$), a significant reduction of particle size which may be at least 2 times smaller, e.g. at least 5 times smaller or even at least 10 times smaller, and much less sediment including at least 2 times less sediment, including at least 5 times, e.g. at least 10 times less sediment.

During their experimentation the inventors have found that the selected pectin fractions which are obtainable by the consecutive acid extraction of a pectin-containing vegetable material by methods as described hereinbefore are very suitable starting materials for making derivatized pectin fractions having exceptionally good functional characteristics. Thus, by subjecting the selected high-esterified pectin fractions according to the invention to reactions involving treatments with an agent capable of deesterifying a high-esterified pectin such as an acid and/or ammonia deesterified and optionally amidated pectin fractions are obtained which are useful as additives in various food products such as for example fruit preparations and dairy products. It has been found that such deesterified pectin fractions with respect to functional properties generally outperform similarly deesterified pectin products which are prepared from bulk-extracted pectin.

Accordingly, the present invention pertains in a further aspect to a method of obtaining deesterified pectin fractions having improved functional characteristics, comprising subjecting selected pectin fractions obtained by consecutive acid extraction of a pectin-containing vegetable material as described hereinbefore to deesterification by at least one step of treatment with an acid and/or ammonia to obtain a pectin fraction having a degree of esterification (DE) which is reduced by at least 5% relative to that of the high-esterified pectin fraction and a degree of amidation (DA) which is in the range of 0–25. In useful embodiments, the resulting deesterified fraction has a DE which is at the most 70% such as less than 60%, including less than 50% such as less than 45%, e.g. a DE in the range of 20–45.

In accordance with this aspect of the invention, the deesterified pectin fractions can be obtained either by deesterification of a high-esterified pectin fraction under acidic conditions, or the high-esterified pectin fraction may be deesterified by initially treating it with an acid and subsequently deesterifying it further under basic conditions by treating the acid-deesterified fraction with ammonia, or the high-esterified pectin fraction may be deesterified exclusively under basic conditions by treatment with ammonia. The acid which is used in this method is preferably a strong inorganic acid such as HCl, $H_2SO_4$, $H_3PO_4$ or $HNO_3$, or an organic acid such as e.g. oxalic acid or formic acid.

Although it is preferred to use an acid in the deesterification step, the use of a base such as alkali metal hydroxides or carbonates, is not excluded.

In an interesting embodiment of the method, deesterified pectin fractions having a degree of esterification which is less than 60% and a degree of amidation which is 0 are obtained by the above deesterification treatment. Such deesterified pectin fractions are very suitable for further deesterification under basic conditions by treatment with ammonia.

In accordance with the invention, the deesterification comprises in a presently preferred embodiment heat treating an aqueous solution or suspension of a high-esterified pectin fraction in the presence of an added strong inorganic or organic acid to give a pH of less than 1. The heat treatment of the selected pectin fraction is carried out at a temperature in the range of from 40 to 80° C. for a period of from 1 to 50 hours. In suitable embodiments, the deesterification step is carried out at a temperature in the range of from 45 to 55° C. for a period of time that is from 4 to 20 hours, such as from 10 to 20 hours or from 4 to 10 hours.

In this connection, useful acids include inorganic acids as exemplified by, but not limited to, hydrochloric acid, sulphuric acid and nitric acid, and organic acids, such as formic acid and oxalic acid. It will be understood that mixtures of acids may also be used in the deesterification reaction.

The amount of acid to be added to the deesterification mixture to obtain an expedient acidification in the mixture during the reaction is typically in the range of 0.005 to 0.015 moles per gram of pectin to be deesterified and the amount of pectin dry matter present in the reaction mixture (deesterification mixture) is typically in the range of from 1 to 5° such as from 1 to 3%, by weight of the reaction mixture.

The deesterified pectin fractions are typically recovered from the reaction mixture by adjusting the pH of the mixture to a value in the range of from 3 to 5 such as from 4 to 5 by the addition of a base, such as for example ammonia, followed by precipitation of the pectin into a water-miscible organic solvent or, as an alternative, into a homogeneous solution of a water-miscible organic solvent and water.

The precipitated pectin is separated from the liquid by any convenient method, such as e.g. by filtration or centrifugation, and the precipitate is pressed and washed on the filter to remove soluble salts and impurities. Finally, the pectin is dried and optionally ground to form a powder.

The organic solvent used may be any water-miscible solvent in which pectin is substantially insoluble. A suitable solvent may be any of the solvents which have been mentioned hereinbefore such as a monohydric alcohol, a dihydric alcohol, a ketone, a glycol ether and mixtures hereof. A presently preferred solvent is isopropanol.

A high-esterified selected pectin fraction of the invention may also be deesterified under basic conditions by treatment of the selected pectin fraction with ammonia. Under these conditions, part of the methoxyl groups in the pectin molecules to be deesterified are replaced by OH groups and part of the methoxyl groups are replaced by $NH_2$ groups. Thus, the deesterification reaction results in a deesterified pectin fraction containing amide groups, i.e. amidated pectin. In such amidated deesterified pectin fractions the ratio between the degree of esterification and the degree of amidation is preferably at least 0.75, such as in the range of 0.75 to 2.00 including the range of 1.0 to 1.5, e.g. in the range of 1.0 to 1.2.

Thus, in another embodiment of the method, a pectin fraction having a degree of amidation in the range of from 5 to 25 are obtained including the range of 15 to 25.

The starting material for the basic deesterification may, as it is mentioned above, be a high-esterified selected pectin fraction according to the invention. However, a high-esterified selected pectin fraction which has first been deesterified under acidic conditions with a strong acid as described hereinbefore, can be used.

The basic deesterification reaction is carried out in a suspension of the pectin fraction starting material in a homogeneous aqueous solution containing a water-miscible organic solvent in the presence of ammonia. During the reaction the pectin to be deesterified is present in a partially hydrated and swollen state which is a prerequisite for an expedient course of the reaction. A partially hydrated and swollen state of the pectin is achieved when the amount of organic solvent used in the water-organic solvent solution is in the range of from 30 to 80 wt % e.g in the range of from 35 to 50 wt %.

The organic solvent used may be any water-miscible solvent in which pectin is substantially insoluble. A suitable solvent may be any of the solvents which have been mentioned hereinbefore, such as a monohydric alcohol, a dihydric alcohol, a ketone, a glycol ether or mixtures hereof. A presently preferred solvent is isopropanol.

The basic deesterification is typically carried out at a temperature in the range of from 0 to 30° C. for a period of from 2 to 8 hours.

The amount of added ammonia used in the reaction mixture is normally in the range of from 0.005 to 0.02 moles such as e.g. 0.010 to 0.015 moles per grams of pectin to be deesterified. The amount of pectin fraction dry matter in the suspension is typically in the range of from 10 to 30 wt % including an amount in the range of from 15 to 20 wt % of the suspension.

It has surprisingly been found that the basic deesterification with ammonia is affected by the presence of alkali metal ions. Thus, it has been found that the presence of sodium ions speed up the deesterification and potassium ions slow down the reaction as compared with a reaction carried out under identical conditions except that no alkali metal ions have been added. Also lithium ions have a velocity increasing effect.

This offers an additional reaction parameter in addition to for example reaction temperature and reaction time to control the deesterification reaction.

Accordingly, in a particular embodiment of the invention the basic deesterification with ammonia is carried out in the presence of a cation of an alkali metal resulting from the addition of a water soluble, neutral alkali metal salt, such as for example a chloride, bromide, sulphate or nitrate of lithium, sodium or potassium.

The ammonia deesterification reaction is quenched by pouring the reaction mixture into a homogeneous mixture of a water-miscible organic solvent as mentioned above, and water followed by adjusting the pH to a value in the range of from 4 to 5 by the addition of an acid such as e.g. hydrochloric acid, sulphuric acid or nitric acid.

As one alternative, the reaction is quenched first by adjusting the reaction mixture to a pH value in the range of from 4 to 5 by addition of the acid and then pouring the neutralised reaction mixture into a homogeneous mixture of a water-miscible organic solvent and water.

As another alternative, the reaction mixture is separated by filtration, and the ammoniacal filtrate is poured into the homogeneous mixture of the organic solvent and water to obtain a precipitate of deesterified pectin. This alternative makes it possible to reuse the ammonia-containing liquid which remains after the precipitate has been separated.

The pectin is separated from the liquid by any convenient method, such as e.g. by filtration or centrifugation, and the pectin is pressed and washed to remove soluble substances and impurities. Finally, the isolated deesterified pectin material is dried and optionally, the dried material is ground to obtain a powder.

The deesterified pectin fraction according to the invention has preferably a degree of esterification which is at the most 45% including at the most 40%. A preferred degree of amidation which is in the range of 5 to 25.

Useful deesterified fractions have a ratio between the degree of esterification and the degree of amidation in the resulting deesterified pectin fraction is at least 0.75, such as in the range of 0.75 to 2.00 including the range of 1.0 to 1.5, e.g. in the range of 1.0 to 1.2.

The deesterified pectin fraction is useful in the preparation of food products as a gelling or thickening agent. Thus, it may be used in the manufacturing of fruit-based products including preserves, jams, jellies, marmalade, bakery product fillings or milk products.

The invention is further illustrated in the following examples which are not intended to be in any way limiting to the scope of the invention as claimed.

EXAMPLES

MATERIALS AND METHODS

Determination of Degree of Esterification (DE), Degree of Amidation (DA) and Anhydrogalacturonic Acid (AUA)

DE, DA and total anhydrogalacturonic acids were determined according to the procedures given in Food Chemical Codex, Third Edition, National Academic Press, Washington 1981, page 216.

Determination of Reduced Viscosity

A quantity of pectin corresponding to 90 mg pectin dry matter is weighed into a 150 ml Erlenmeyer flask together with 100 g buffer solution which is prepared by dissolving 1 g sodium hexametaphosphate in distilled water and adjusting the pH value to 4.5 with a few drops of 4N hydrochloric acid. After a few hours of stirring the pectin is dissolved. If the solution is not clear it is filtered through a porosity 2-filter crucible. Dropping periods of the resulting pectin solution and the buffer solution, respectively are measured at 20° C. in a falling ball viscometer (Hoeppler Viscometer).

The specific viscosity is:

$\eta_{sp}$=(dropping period for pectin solution/dropping period for buffer solution)−1

The reduced viscosity is:

$\eta_{red}=\eta_{sp}/C=\eta_{sp}/1$ (L/g)

Determination of US-SAG°

The SAG-value expresses the ability of the pectin to interact, mainly by hydrogen bonding, with sugar in a sugar gel which is completely gelled. The SAG-value is a measure of the solidity of the gel (gel strength), without disrupting the gel, and was determined according to the IFT SAG method as described in Food Technology, 1959, 13, 496–500.

Determination of Setting Time

The setting time of the pectin fractions was determined according to the method described by G. H. Joseph and W. E. Bair (Food Technology, 1949, 18, 18–22).

Determination of Viscosity Grade (Visc°)

The viscosity grade (Visc°) is related to 0.6 g of an ideal pectin of viscosity 40 centipoise (cP) in a 0.6 wt aqueous solution under specified measuring conditions.

The viscosity grade of a pectin sample is determined by measuring the viscosity of solutions of different pectin concentration by means of a Haake Viscometer VT 181 at speed 4 and a temperature of 25° C. By plotting the measured values in a semi-logarithmic diagram the amount (A) of pectin giving a viscosity of 40 cP is found. The viscosity grade (Visc°) is 0.6×100/A.

Determination of Jelly Strength

The jelly strength or breaking strength is determined on a test gel by determining the force necessary to pull an open plastic body out of the gel.

The test gel was prepared from:

216 g sugar 147 g buffer solution pH 3.0 (lactic acid; potassium acetate, water)

0.845 g pectin (=0.25%)

0.1 g antifoaming agent

The breaking strength of the test gel is measured by means of a Herbstreith-Pektinometer Mark III and is indicated in Herbstreith-Pektinometer-Units (HPU).

Example 1

600 g dry lemon peel having a dry matter content of 91.3% was suspended in 9000 g of deionised water and the suspension was heated to a temperature of 70° C. during gentle stirring. By addition of nitric acid (69%) pH was adjusted to 2.5. The suspension was gently stirred for 2 hours at 70° C. after which the liquid was separated from the extracted peel on a sieve and the liquid was filtered on a nylon cloth covered with Celite 545. The extracted pectin was precipitated by pouring the clear filtrate into two volumes of isopropanol during stirring. The precipitated pectin was separated by draining on a filter and washed with 60% (w/w) isopropanol/water mixture. After draining and pressing in a cloth the wet pectin was dried overnight in a drying oven at 40° C. The dried pectin was milled to a fine powder. The yield of pectin was 44.4 g (Fraction 1).

The peel residue from the first extraction was subjected to a second extraction by suspending the peel residue in deionized water to a total weight of the suspension of 9000 g, heating the suspension to 70° C. during gentle stirring. By addition of nitric acid the pH of the mixture was adjusted to 1.7. The mixture was stirred for two hours at a temperature of 70° C. after which the pectin extract was separated from the solid peel material. The extracted pectin was recovered from the extract as described above. The yield of dry pectin was 51.8 g (Fraction 2).

The peel residue from the second extraction was subjected to a third extraction by suspending the peel residue in deionized water to a total weight of the suspension of 9000 g, heating the suspension to 70° C., adding nitric acid to pH 1 and stirring the mixture for one hour at a temperature of 70° C. The extracted pectin was recovered as described above for the first and the second extraction. The yield of dry pectin was 23.5 g (Fraction 3).

In order to remove calcium present in the isolated pectin, the recovered pectin was suspended in 10 parts by weight of 60% (w/w) isopropanol/water mixture containing 3 wt % HCl, stirred therein for 15 minutes, separated by filtration and washed on the filter with 60% (w/w) isopropanol/water mixture until the filtrate was free of chloride. Finally, the pectin was suspended in 10 parts by weight of 60% (w/w) isopropanol/water mixture containing 0.5 wt % ammonia, separated by filtration, washed on the filter with 60% (w/w) isopropanol/water mixture and dried.

The analytical characteristics of the pectin fractions are shown in the below Table 1.1.

TABLE 1.1

|  | Fraction 1 | Fraction 2 | Fraction 3 |
|---|---|---|---|
| Degree of esterification (%) | 75.9 | 69.0 | 56.2 |
| % AUA° | 87.0 | 85.1 | 77.5 |
| US-SAG° | 244 | 231 | 175 |
| Setting time (sec) | 20 | 110 | 410 |
| Visc° | 84.2 | 79.3 | 42.2 |

Example 2

Extraction of Lime Peel 2.1. Pre-treatment of the Peel 268 g lime peel having a dry matter content of 90.3 wt % was suspended in 2950 g of a 40% (w/w) isopropanol/water mixture. The suspension was heated to a temperature of 70° C. and by dropwise addition of nitric acid (35%) pH was adjusted to 1.4. After having been stirred at a temperature of 70° C. for 3 hours, the peel material was separated from the reaction mixture by filtration on a nylon cloth. The solid peel material was pressed/squeezed to remove as much as possible of the liquid. The separated peel material was dried overnight at a temperature of 40° C.

2.2. Extraction of Pre-treated Lime Peel

The pre-treated and dried lime peel was suspended in 8 kg of an aqueous solution containing calcium chloride (15 mmol/l). The suspension was heated to a temperature of 60° C. and the pH was adjusted to 4 by addition of ammonia. The peel material was extracted for 4 hours while stirring the suspension whereupon the liquid pectin extract and the solid extraction residue was separated by filtration on a nylon cloth.

The pH of the pectin extract was adjusted to 2 by addition of nitric acid and subsequently the pH was raised to about 3 by addition of a cation exchange resin (Amberlite 200) in Na$^+$ form. The mixture was stirred at ambient temperature for 2 hours. The cation exchanger was removed by filtration and the pectin was precipitated by pouring the filtrate into 12 kg isopropanol while stirring. The pectin was separated from the liquid by filtration on a nylon cloth, squeezed and washed on the filter with 60% (w/w) isopropanol/water mixture. The pectin was dried overnight at a temperature of 40° C. The yield was 36.5 g (Fraction 1).

The solid peel material from the first extraction was subjected to a second extraction by suspending it in 8 kg of an aqueous solution containing calcium chloride (15 mmol/l). The suspension was heated to 60° C. and the pH was adjusted to 1.7 by addition of nitric acid. The peel material was extracted for 4 hours after which the pectin extract was separated from the solid material by filtration. The pectin was recovered as described above for the first pectin extract. The yield was 11.4 g (Fraction 2).

The analytical characteristics of the pectin fractions are shown in the below Table 2.1.

TABLE 2.1

|  | Fraction 1 | Fraction 2 |
| --- | --- | --- |
| Degree of esterification (%) | 72.9 | 64.9 |
| % AUA | 81.0 | 81.0 |
| US-SAG° | 190 | 193 |
| Setting time (sec) | 60 | 270 |
| Visc° | 60.7 | 49.8 |

Example 3

Extraction of Lemon Peel 300 g dry lemon peel was suspended in a mixture of 7200 g deionized water and 14.3 g 68% nitric acid and gently stirred for 3 hours at 70° C. at a pH of 2.4. Then the liquid was separated from the extracted peel by draining through a stainless steel sieve with 1 mm aperture. The peel residue was washed for half an hour by suspension in 2000 g of water at 70° C. and then drained off again.

The wet peel residue (2458 g) from the first extraction was subjected to a second extraction by suspension in 2750 g of water with added 8.04 g of 68% nitric acid. The mixture was gently stirred for 3 hours at 70° C. at pH 1.80. The peel residue was separated on the sieve and subjected to a third extraction with 1800 g of water and 4.48 g 68% nitric acid for 1 hour at 80° C. at a pH of 1.5. The extraction mixture was then separated on the sieve and the peel residue washed twice with each 1200 g of water at 80° C. for half an hour. The extracts from the first extraction and the following wash were combined and purified by filtration through a vacuum filter covered by diatomaceous earth. The clear filtrate was concentrated by evaporation in vacuum and the viscous concentrate precipitated by stirring it into two parts of 85% isopropyl alcohol. Then the precipitated pectin was separated by draining on a filter and washed with 60 vol % isopropyl alcohol. The pH was adjusted to about 3.5 by addition of 20% sodium carbonate. After draining and pressing in a cloth the pectin was dried in a drying oven at 40° C. over night. The dry pectin (Fraction 1) was milled to a fine powder.

The extracts from the second and third extractions and the following washes were combined and the pectin (Fraction 2) isolated in a similar way.

The yields and the analyses of the two pectin fractions are shown in Table 3.1.

TABLE 3.1

|  | Fraction 1 | Fraction 2 |
| --- | --- | --- |
| Pectin yield (%) | 16.2 | 13.4 |
| Degree of esterification (%) | 75.5 | 68.4 |
| % AUA | 85.5 | 79.7 |
| US-SAG° | 207 | 207 |
| Setting time (sec.) | 50 | 90 |
| Reduced viscosity | 0.625 | 0.540 |
| Jelly strength (HPE) | 721 | 684 |

Example 4

Extraction of Lime Peel 4.1. Pre-treatment of the Lime Peel 134 g of dried lime peel material (dry matter content 90.3 wt %) was suspended in 1475 g 40% w/w isopropanol/water mixture in a 5 liter glass reactor. The suspension was heated to a temperature of 70° C. for 3.5 hours under steady stirring while maintaining the pH in the suspension at a level of about 2 (1.7–2.1) by addition of nitric acid (35%). The peel material was separated from the reaction medium by filtration on nylon cloth. The reaction medium had a green appearance, with a content of dense cloudy substances. The separated peel material was dried overnight at a temperature of about 40° C. The yield of dried, pre-treated lime peel material was 114 g (85%) having a DE of 71.5 and a content of AUA of 44.9%.

4.2. Extraction of Pre-treated Lime Peel

The dried peel material (114 g) from the above pre-treatment was suspended in 4000 g of an aqueous solution containing calcium chloride (30 mmol/l) and the pH of the suspension was adjusted to 4 by addition of ammonia. The suspension was heated to a temperature of 70–72° C. for 17 hours under steady stirring, after which the liquid solution and the solid extraction residue was separated by filtration on a nylon cloth.

The pH of the extract was adjusted to 2.2 by addition of nitric acid (35%). The pH of the solution was raised to 2.8 by addition of a strongly acidic cation exchange resin (Amberlite 200) in Na$^+$ form, after which the extract was stirred at ambient temperature for 5 hours. The ion exchange material was separated by filtration. Isopropanol (2 part IPA to 1 part filtrate) was added to the filtrate to precipitate pectin which was recovered by filtration and dried overnight at a temperature of 40° C. The yield of pectin (sodium salt) was 15.5 g (Fraction 1) having the following characteristics: DE of 77.2, % AUA of 77.3, US-SAG° of 234 and a setting time of 30 sec.

The solid extraction residue, which was separated from the extract, was dried overnight at a temperature of about 40° C. The yield was 98.5 g of partially extracted lime peel having the following characteristics: Degree of esterification 67.5 and % AUA 35.7.

The partially extracted lime peel material (98.5 g) from the first extraction was suspended in 4000 g deionized water. The suspension was acidified to pH 2 by addition of nitric acid (35%) and heated to a temperature of 70° C. for about 15 hours under steady stirring. The reaction mixture was separated by filtration into a solid extraction residue and a liquid fraction containing the extracted pectin. The pH of the extract was adjusted to 2.3 by addition of nitric acid, and by addition of the Na⁺ form of a strongly acidic cation exchange resin (Amberlite 200) the pH was raised to 3.2. The mixture was stirred for 6 hours at ambient temperature after which the ion exchange resin was separated by filtration and the pectin was precipitated by addition of isopropanol to the filtrate. The pectin was collected by filtration, washed twice with 60% (w/w) isopropanol/water mixture and dried overnight at a temperature of 40° C. The yield of pectin (sodium salt) was 13.2 g (Fraction 2).

The analytical characteristics of the recovered pectin fractions are shown in the below Table 4.1.

TABLE 4.1

|  | Fraction 1 | Fraction 2 |
| --- | --- | --- |
| Degree of esterification (%) | 77.2 | 70.5 |
| % AUA | 77.3 | 77.0 |
| US-SAG° | 234 | 218 |
| Setting time (sec) | 30 | 120 |
| Visc° | 80.5 | 56.2 |
| Na (wt %) | 1.1 | 1.1 |
| Ca (ppm) | 780 | 320 |

Example 5

The Preparation of Drinking Yoghurt

Pectin fraction 2 from the above Example 1 was tested in a drinking yoghurt system having the following composition:

| Yoghurt base | 489 g |
| --- | --- |
| Sugar | 44 g |
| Water | 14.2 g |
| Pectin | x g |
| Dextrose | 2.8–x g |

For purposes of comparison was used a commercial bulk extracted pectin from Danisco Ingredients, Brabrand, Denmark with the following characteristics: DE of 70.0, % AUA of 82.9, US-SAG° 235 and setting time 130 sec. In the following, this pectin product is also referred to as "reference".

The yoghurt base was "Letrmlks Yoghurt Naturel" (Kløver Mælk, Denmark) having a fat content of 1.5%, a MSNF content of 9% and a pH of 4.3.

The yoghurt base was stirred for 15 minutes with a high-speed mixer to break down the gel structure and make the yoghurt liquid. The pectin was dry-mixed with dextrose and sugar and the pectin-sugar mixture was added slowly to the yoghurt base while stirring the yoghurt mixture. The water was added and stirring was continued for another 15–20 minutes.

The yoghurt drinks were homogenised at 200 bar at room temperature and filled into glass bottles. The yoghurt drinks were then heat treated for 20 minutes in a water bath at a temperature of 75° C. The bottles were shaken vigorously each 5 minutes. The samples were cooled to room temperature and kept overnight at 5°C.

The physical quality of a yoghurt drink may be characterised by the viscosity and the particle size distribution of the drink.

A low viscosity of a yoghurt drink is often more preferred than a high viscosity. The composition of the yoghurt drink and the process by which it has been produced influences the viscosity but the pectin and the dosage of the pectin used for stabilisation will also affect the viscosity. If the pectin has been added at concentrations insufficient for stabilisation or has been added at excess concentrations the viscosity will be higher than at the optimal concentration of pectin. The optimal concentration of pectin is characterised by the lowest possible concentration of pectin sufficient for stabilisation of the drink. At this concentration the viscosity of the yoghurt drink will be minimal.

The viscosity was measured by means of a Brookfield Viscometer (Model LVTDV-II) at a speed of 30 rpm using spindles no. 6.1 or 6.2. Yoghurt drink (350 ml) was poured into a 400 ml glass beaker and tempered to a temperature of 10° C. The viscosity was read in centipoise (cP) after an equilibrium time of 30 seconds. The measurements were performed after 1 day of storage of the yoghurt drinks. The results are shown in Table 5.1.

The particle size distribution was measured by means of a Malvern Mastersizer S using a citrate-phosphate buffer with pH 4.2 and the standard 30HD presentation model. The determination was based on the average of a double determination and is reported as the median volumetric particle size D (v, 0.5). The measurements were performed after 1 day of storage of the yoghurt drinks. The results are shown in Table 5.1.

The physical stability of the yoghurt drinks were evaluated by an accelerated test by exposing the drinks to severe mechanical stress by centrifugation after 1 day of storage.

The accelerated sedimentation test was performed by means of a Varifuge 3.2S. About 40 g yoghurt drink was weighed into a 50 ml centrifuge glass. The sample was centrifuged at 3500 rpm for 20 minutes at room temperature. The supernatant was removed and the glass was left up-side down for 5 minutes before the remaining sediment was weighed.

The sediment was calculated and expressed in wt % based on duplicate determinations:

% sediment=weight of sediment×100/weight of sample

The results are shown in Table 5.1. For a yoghurt drink to be physically stable throughout the shelf life the % sediment value must be low, preferably below 5 wt %.

TABLE 5.1

| Pectin sample/wt % | Viscosity (cP) | Particle size (μm) | Sediment (wt %) |
| --- | --- | --- | --- |
| Fraction 2 | | | |
| 0.00 | 731.0 | 23.0 | 34.0 |
| 0.10 | 154.0 | 10.0 | 21.0 |
| 0.15 | 29.1 | 2.2 | 4.2 |
| 0.20 | 42.4 | 1.9 | 2.5 |
| 0.25 | 69.5 | 1.7 | 1.7 |
| 0.30 | 126.0 | 1.8 | 1.7 |
| Reference | | | |
| 0.00 | 731.0 | 23.0 | 34.0 |
| 0.10 | 832.0 | 23.0 | 45.0 |
| 0.15 | 322.0 | 13.0 | 26.0 |
| 0.20 | 127.0 | 8.0 | 12.0 |
| 0.25 | 57.1 | 3.3 | 4.5 |
| 0.30 | 58.8 | 2.1 | 2.6 |
| 0.35 | 74.1 | 1.9 | 2.2 |

Pectin fraction 2 is very suitable for stabilisation of drinking yoghurt. The pectin stabilise the pasteurised yoghurt drink with about 0.15 wt % pectin whereas the above reference bulk extracted pectin from Danisco Ingredients needs to be dosed in an amount of about 0.25 wt % before the yoghurt is stable.

In addition, with pectin fraction 2 dosed at its optimal concentration of 0.15 wt % the viscosity of the yoghurt drink is only 29 cP whereas the viscosity of the yoghurt drink containing the optimal concentration of 0.25 wt % of the reference bulk extracted pectin is 57 cP.

Example 6

Pre-treatment of Lime Peel and Extraction of Pre-treated Lime Peel 268 g lime peel (dry matter content 90.3 wt %) was suspended in 2950 g of a 40% isopropanol solution in water in a 5 liter three-necked glass flask. The suspension was heated to 70° C. and 42.5 g 35% nitric acid was added dropwise to obtain a pH of 1.6. The suspension was stirred at a temperature of 70° C. for 3 hours.

The pre-treated peel material was separated from the liquid by filtration on a nylon cloth. The material was squeezed to remove as much as possible of the liquid and the material was dried at a temperature of 40° C. overnight giving about 200 g of pre-treated peel material.

The pre-treated lime peel material was extracted as described in Example 2 to obtain a first pectin fraction having a DE of 74.1 and Visc° of 74, and a second pectin fraction having a DE of 60.4 and a Visc° of 31.

Example 7

Acidic Deesterification of a Selected First Pectin Fraction 30 g of the selected first pectin fraction from Example 6 was suspended in 1470 g deionized water in a 3 liter three-necked glass flask and stirred using an Ultra Thurax blender at maximum speed until a homogeneous solution was obtained.

The solution was heated to 73° C. and 65.2 g nitric acid (35%) was added to obtain a pH of 0.6. The mixture was stirred at 73° C. for 5.0 hours followed by adjusting the pH of the mixture to 4 by addition of ammonia solution and without further cooling the mixture was precipitated into 3000 g of 60% isopropanol solution in water while stirring gently.

The precipitate of deesterified pectin was separated by filtration using a nylon cloth and the material was squeezed to remove as much as possible of the liquid. The separated pectin was washed twice on the filter with isopropanol-water solution to remove salts. The washed material was dried at 40° C. overnight and ground on a Retsch mill to give a powder with a particle size of less than 0.5 mm and having a DE of 34.7 and a Visc° of 21.7.

Example 8

Acidic Deesterification of a Selected Second Pectin Fraction 30 g of the selected second pectin fraction from Example 6 was deesterified substantially as described in Example 7 using 67.1 g nitric acid at 60° C. for 8.8 hours to give a deesterified pectin having a DE of 35.6 and a Visc° of 21.2.

Example 9

Application of an Acid-deesterified Pectin Fraction in a Bakery Filling

The deesterified pectin fraction from Example 7 was tested in a high-sugar bakery filling against a bulk extracted lime pectin which was deesterified following the same procedure as described in Example 7 to give a deesterified bulk pectin product having a DE of 34.5 and a Visc° of 35.

A bakery filling is defined as a filling mainly comprising fruit, sugar, water, acid and stabiliser which is intended for use in bakery products such as cakes, cookies, pies etc. and the filling is baked on the cake. A bakery filling is not a gel but a pre-gelled system.

The bakery filling was prepared according to the following procedure:

Raspberry (300 g), sugar (435.5 g) and glucose syrup (150 g; 42 DE, 75% SS) was added to a 1 kg Fizzler pan (tarred with a stirrer) and heated. The weight of the mixture was reduced to 770 g by boiling.

Pectin (12 g) was dissolved in hot (80° C.) deionized water (200 g) while stirring and the pectin solution was added to the fruit/sugar solution in the pan, stirring continuously. The solution should have a temperature of 85° C.

Calcium citrate (2 g) was dry-mixed with sugar (60 g) and boiling, deionized water (40 g) was added to the blend of calcium citrate and sugar to make a slurry. The slurry (temperature: 88–90° C.) was added to the pan while agitating vigorously and keeping the pan at a temperature of 80° C.

Potassium sorbate (2 g) and sodium benzoate (3 g) was added, and pH was adjusted to 3.6 with citric acid/sodium citrate.

The mixture in the pan was cooled from 80° C. to filling temperature (40° C.) and filled into moulds.

Three different baking tests were made:
a. On biscuits, 200° C. for 10 minutes.
b. On biscuits, 200° C. for 15 minutes.
c. In aluminum dishes, 220° for 10 minutes.

a and b: A sample of the bakery filling was poured into a standard mould (d=75 mm, h=10 mm) and placed at the centre of a biscuit. The surface was scraped horizontally with a knife and the mould was carefully removed. The biscuits were baked on a baking plate at a temperature of 200° C. for 10 and 15 minutes.

c: A sample (20 g) of the bakery filling was pumped into the middle of a round aluminum dish (d=75 mm). The aluminum dishes were placed on a baking plate and baked at a temperature of 220° C. for 10 minutes.

The evaluation of the baking tests is shown in the below Table 9.1.

TABLE 9.1

| Pectin sample | Baking stability | Syneresis stability | Appearance |
| --- | --- | --- | --- |
| Example 7 | Good. Form stable | Good. No juice separation | Good. Form stable. Shiny surface |
| Deesterified, bulk extracted pectin | Poor. Form unstable | Poor. Juice separation | Poor. Form unstable. Gritty surface |

Example 10

Acidic Deesterification Combined with Basic Deesterification of a Selected First Pectin Fraction 80 g of a first high-esterified pectin fraction obtained as described in Example 4 and having a DE of 73.8, a Visc° of 72.4, a SAG° of 246 and a setting time of 47 sec was suspended in 3920 g deionized water in a 5 liter glass reactor. The suspension was stirred with an Ultra Thurax stirrer at maximum speed until a homogeneous solution was obtained. The solution was heated to a temperature of 45° C. and 200 g of nitric acid (35%) was added while stirring gently. The solution was stirred for 17 hours at a temperature of 45° C.

The pH of the reaction mixture was adjusted to 4 by addition of ammonia solution and the mixture was precipitated into 8000 g of isopropanol. The precipitated pectin was separated from the reaction mixture by filtration on a nylon cloth. The separated pectin was pressed/squeezed to remove as much as possible of the liquid and washed twice with 60% isopropanol-water solution. The pectin was dried at 40° C. overnight. The dried pectin was ground on a Retsch Mill to obtain a powder having a particle size less than 0.25 mm and a DE of 55.7 and Visc° of 63.

30 g of the above deesterified pectin fraction was suspended in a solution of isopropanol (77,9 g), water (91.4 g) and ammonia (7.7 g) at a temperature of 0° C. and the suspension was stirred vigorously at a temperature in the range of from 0° C. to 4.5° C. for 3.7 hours.

The amidation reaction was quenched by pouring the reaction mixture into 200 g 60% isopropanol-water solution and adjusting the pH to 4.4 by adding nitric acid.

The amidated material was separated by filtration and washed free of salts with 60% isopropanol-water solution and dried at 40° C. overnight. The dried material was ground to obtain a powder having a particle size of less than 0.25 mm. The deesterified pectin fraction had a DE of 29.6% and a degree of amidation (DA) of 21.2%.

Example 11

Acidic Deesterification Combined with Basic Deesterification of a Selected First Pectin Fraction Following the procedure as described in Example 10 except that the acid deesterification was carried out at a temperature of 53° C. for 13 hours, which gave a product having a DE of 53.1 and a Visc° of 56, and the amidation time was 4.7 hours, a pectin fraction having a DE of 25.1 and a DA of 22.5 was obtained.

Example 12

Acidic Deesterification Combined with Basic Deesterification of a Selected Second Pectin Fraction 80 g of a second pectin fraction obtained as described in Example 4 having a DE of 64.1, a Visc° of 55, a SAG° of 256 and a setting time of 213 sec was suspended in 3920 g water in a 5 liter glass reactor. The suspension was stirred with an Ultra Thurax stirrer running at maximum speed until a homogeneous solution was obtained.

Deesterification was carried out substantially as described in Example 10 with the modification that the reaction was accomplished at a temperature of 53° C. for 5.1 hours, to provide a pectin fraction having a DE of 55.5 and a Visc° of 51.7.

Following the same procedure as described in Example 10 the deesterified pectin fraction was amidated at a temperature in the range of from 0 to 4.5° C. for 3.0 hours to obtain a fraction having a DE of 29.4 and a DA of 21.5.

Example 13

Acid Deesterification Combined with Basic Deesterification of a Selected Second Pectin Fraction By following the procedure as described in Example 11 except that the amidation time was 3.5 hours a deesterified pectin fraction having a DE 27.3 and a DA of 22.9 was obtained.

Example 14

Acidic Deesterification Combined with Basic Deesterification of a Bulk Extracted Pectin Bulk extracted pectin from lime was deesterified and amidated following the same procedures as described in Examples 10 and 11 to obtain a bulk extracted pectin material having a DE of 29.7 and a DA 21.0.

Example 15

Measurement of Viscosity Profiles (Brabender test) for Pectin Fractions of Examples 10–14

The gelling behaviour under shear conditions of the amidated pectin fractions obtained in Examples 10, 11, 12, 13 and 14 respectively was recorded by means of a Brabender-Viskograph-E (model 8025) which is a rotational viscometer consisting of a basic unit, control unit and a continuous line recorder for torque (viscosity) and temperature.

The Brabender measurement on a gelling system as a function of the temperature visualises the viscosity development in the system from a visco-elastic system (at high temperature) via gelling to gel breakdown resulting in formation of a paste due to shear forces. Thus, the Brabender test is a very suitable method for characterizing food preparations, such as for example fruit preparations, to obtain a better understanding of the functionality of the pectin in such systems.

The gelling behaviour of the pectin to be tested was examined in a model system (=an artificial fruit preparation), having pH 3.8 and containing 38; soluble solids, consisting of: 37.0 wt % sugar, 28.4 wt % water, 0.6 wt % pectin sample to be tested, 0.7 wt % $CaCl_2.2\ H_2O$ and 34.0 wt % of an aqueous buffer solution (pH 3.8) containing per liter:

1.95 g tripotassium phosphate ($K_3PO_4$, 2 $H_2O$), 6.33 g tripotassium citrate ($K_3C_6H_5O_7$, $H_2O$), 0.82 g trisodium citrate($C_6H_5Na_3O_7$, 2 $H_2O$), 1.19 g tricalcium dicitrate ($C_{12}H_{10}Ca_3O_{14}$, 4 $H_2O$), 2.02 g magnesium acetate ($C_4H_6MgO_4$, 4 $H_2O$), 1.00 g sodium benzoate ($C_6H_5NaO_2$) and 14.0 g citric acid ($C_6H_8O_7$).

This system was prepared at a temperature of about 80° C. by dissolving the pectin sample, dry-blended with part of the sugar (60 g), in hot demineralised water (80° C.) and when these components were dissolved the rest of sugar was added and dissolved in the hot solution. Then calcium chloride was added followed by the addition of the buffer solution. Finally, 4.5 ml 1N hydrochloric acid was added.

The Viskograph test was carried out as follows:

The test solution (514 g) was placed in the measuring bowl of the Brabender Viskograph, and the temperature of the solution was ajusted to 80° C. by heating. After a holding time of 5 minutes at 80° C. the solution was cooled at a constant rate of 1° C. per minute while rotating the measuring bowl at a speed of 50 rpm. During the measurement the current values of torque (viscosity) and temperature were recorded. The torque (viscosity) is given in BU (BRABENDER units). The results are in Table 15.1.

TABLE 15.1

| Pectin sample Exp. | % DE | % DA | Brabender viscosity at temperature °C. | | | | | | Gelling temp. interval °C. |
|---|---|---|---|---|---|---|---|---|---|
| | | | 75 | 65 | 55 | 45 | 35 | 25 | |
| 10 | 29.6 | 21.2 | 15 | 20 | 50 | 270 | 720 | 820 | 19 |
| 11 | 25.1 | 22.5 | 50 | 120 | 250 | 400 | 530 | 730 | 19 |
| 12 | 29.4 | 21.5 | 10 | 15 | 30 | 440 | 1300 | 1700 | 12 |
| 13 | 27.3 | 22.9 | 10 | 20 | 70 | 600 | 900 | 840 | 15 |
| 14 | 29.7 | 21.0 | 150 | 170 | 450 | 570 | 650 | 710 | 24 |

It appears from Table 15.1 that the deesterified and amidated pectin fractions obtained from high-esterified pectin fracitons have a significant lower "hot viscosity" (70–80° C.) and a narrower gelling temperature interval as compared to a similarly treated pectin product obtained from a bulk extracted pectin of same origin as the selected pectin fractions.

Example 16

Basic Deesterification in the Presence of Alkali Metal Ions 6 g of a first pectin fraction having a DE of 73.8 was amidated at a temperature of 20° C. for 6.5 hours in a solution of 15.68 g isopropanol, 16.91 g water and 2.64 g 25% ammonia solution. The ammonia concentration in the solution was 1.9 wt %. There was obtained a pectin fraction having a DE of 30.7 and a DA of 21.5.

In a second experiment, 6 g of the same pectin fraction was amidated at a temperature of 20° C. for 6.5 hours in a solution 15.68 g isopropanol, 16.91 g water, 2.64 g 25% ammonia solution and 1.00 g sodium chloride. There was obtained a pectin fraction having a DE of 22.4 and a DA of 17.7.

Following the same procedure as above except that sodium chloride was replaced with 1.276 g potassium chloride, a pectin fraction having a DE of 32.1 and a DA of 16.9 was obtained.

Example 17

Extraction of Lime Peel 250 g dry lime peel having a dry matter content of 90.0% was suspended in 4700 g deionized water and the suspension was heated to a temperature of 70° C. with gentle stirring. By addition of concentrated nitric acid (10.1 g) pH was adjusted to 2.5. The suspension was gently stirred for 2 hours at 70° C. after which the liquid was separated from the extracted peel on a sieve. The peel residue was washed twice with hot water (2×800 ml) and drained.

The wet peel residue from the first extraction was subjected to a second extraction by suspension in water (total weight of peel material+water: 4950 g) with 6.97 g of concentrated nitric acid added. The mixture was stirred gently for 2 hours at 70° C. at pH 2.0. The peel residue was separated on a sieve and washed twice with hot water (2×800 ml) and then drained off again.

The wet peel residue from the second extraction was subjected to a third extraction by suspension in water (total weight of peel material+water: 4950 g) with 13.24 g concentrated nitric acid added. The mixture was stirred gently for 2 hours at 70° C. at pH 1.7. The extraction mixture was then separated on the sieve and the peel residue washed twice with hot water (2×800 ml).

The extract and the wash water from the first extraction were combined and purified by centrifugation followed by filtration through a vacuum filter covered by filter aid (Celite). The clear filtrate was stirred at ambient temperature with the $Na^+$ form of a strongly acidic cation resin (Amberlite 200C) for at least 4 hours. The cation exchanger was removed by filtration and the pH of the pectin filtrate was adjusted to 3–3.2 by addition of ammonia.

The filtrate was concentrated by evaporation in vacuum to a pectin concentration of about 1–2% and the pectin was precipitated by pouring the concentrated pectin solution into the double volume of isopropanol (100%).

The pectin was separated from the liquid by filtration on a nylon cloth, squeezed and washed on the filter with 60% (w/w) isopropanol/water solution (mixture). The pectin was dried overnight in an air oven at a temperature of 40° C. The yield was 35.5 g (Fraction 1).

The extracts and the wash water from the second respectively the third extraction were combined and the pectin (Fraction 2 and Fraction 3) isolated in a similar way.

The yields and the analytical characteristics of the three pectin fractions are shown in the below Table 17.1.

TABLE 17.1

| | Fraction 1 | Fraction 2 | Fraction 3 |
|---|---|---|---|
| Pectin yield (g) | 35.5 | 33.3 | 15.8 |
| Degree of esterification (%) | 75.8 | 69.6 | 63.2 |
| % AUA | 79.0 | 79.9 | 75.0 |
| US SAG° | 219 | 234 | 205 |
| Setting time (sec) | 70 | 155 | 262 |
| Visc° | 74.0 | 81.8 | 65.4 |

Example 18

The Preparation of Drinking Yoghurt

The pectin fractions from the above Example 17 were tested in a drinking yoghurt system having the following composition:

| | |
|---|---|
| Yoghurt base | 258.8 g |
| Sugar | 44 g |
| Water | 244.4 g |
| Pectin | x g |
| Dextrose | 2.8–x g |

For purposes of comparison a bulk extracted pectin with the following characteristics was used:

| | |
|---|---|
| Degree of esterification (%): | 67.3 |
| % AUA: | 85.1 |
| US SAG°: | 224 |
| Setting time (sec): | 155 |
| Visc°: | 75.8 |

The bulk extracted pectin was prepared as described in the following:

157 g lime peel having a dry matter content of 94.4 wt % was suspended in 5500 g of deionized water and heated to a temperature of 70° C. By addition of nitric acid (69%) pH was adjusted to 1.7. The suspension was stirred gently for 4 hours at 70° C. After the liquid was separated from the extracted peel material on a sieve the liquid was drained off on a nylon cloth filter covered with Celite 545. The resulting filtrate was treated overnight with an ion exchange resin (Amberlite 200 C) and subsequently concentrated to about 1.5% pectin. The extracted pectin was precipitated by pouring the clear filtrate into two volumes of isopropanol during stirring. The precipitated pectin was separated by draining on a filter. After draining and pressing the wet pectin was dried in an air oven at a temperature of 40° C. overnight. The dried pectin was milled to a fine powder. The yield was 49 g.

The yoghurt base was made of recombined skimmed milk powder to a MSNF content of 17% and acidified with Glucono Delta Lactone (GDL) to a pH of 4.0.

The pectin and dextrose was added to the water while stirring. It was left to dissolve for about 20 min and then the sugar was added. The yoghurt base was stirred for 15 min and added to the pectin solution. The yoghurt mixture was stirred for another 30 min.

The yoghurt drinks were homogenised at 200 bar at room temperature and filled into plastic bottles. The yoghurt drinks were then heat treated for 10 min in a waterbath at a temperature of 75° C. The bottles were shaken vigorously every 5 min. The samples were then cooled and kept overnight at 5° C.

The physical quality of a yoghurt drink can be characterised by the viscosity and the sedimentation.

Low viscosity yoghurt drinks are often preferred to high viscosity yoghurt drinks. The composition of the yoghurt drink and the process by which it has been produced affects the viscosity but also the dosage of the pectin used for stabilisation will affect the viscosity. With addition of an insufficient amount of pectin the drink will not be stable and the viscosity will be higher if it is a high solid content (8–9%) MSNF drink than that of a stabilised drink. Also with addition of excess pectin the viscosity will be higher than that obtained with an optimum pectin concentration.

The viscosity was measured on a Brookfield Viscometer (Model LVTDV-ll) with spindles no. 6.1 or 6.2 at 30 rpm. The yoghurt drink (approx. 350 ml) was poured into a 400 ml glass beaker and tempered to a temperature of 10° C. The viscosity was then read in centipoise (cP) after an equilibrium time of 30 sec. The measurements were performed after 1 day of storage.

The physical stability of the yoghurt drinks were evaluated by an accelerated test exposing the drinks to a severe mechanical stress by centrifugation after 1 day of storage.

About 40 g of yoghurt drink was weighed into a 50 ml centrifuge glass. The sample was then centrifuged at 3500 rpm for 20 min. at room temperature. The supernatant was removed and the glass was left up-side down for 5 min. before the remaining sediment was weighed.

The sediment was calculated and expressed in wt % based on duplicate determinations: % sediment=Weight of sediment×100/weight of sample The results are shown in Table 18.1. The optimum pectin concentration is characterised by a minimum viscosity and a sedimentation below 2%.

TABLE 18.1

| Pectin sample/wt % | Viscosity (cP) | Sediment (wt %) |
|---|---|---|
| Bulk extracted pectin | | |
| 0.00 | 333 | 26.9 |
| 0.10 | 243 | 35.1 |
| 0.15 | 326 | 32.3 |
| 0.175 | 230 | 26.0 |
| 0.20 | 221 | 13.8 |
| 0.25 | 147 | 5.9 |
| Fraction 1 (Example 17) | | |
| 0.00 | 283 | 26.5 |
| 0.10 | 309 | 28.7 |
| 0.15 | 300 | 21.7 |
| 0.175 | 206 | 17.7 |
| 0.20 | 35.4 | 3.6 |
| 0.25 | 29.0 | 1.1 |
| Fraction 2 (Example 17) | | |
| 0.00 | 283 | 26.9 |
| 0.10 | 138 | 15.4 |
| 0.15 | 26.8 | 2.9 |
| 0.175 | 20.4 | 1.9 |
| 0.20 | 22.8 | 1.6 |
| 0.25 | 36.0 | 1.5 |
| Fraction 3 (Example 17) | | |
| 0.00 | 283 | 26.5 |
| 0.10 | 355 | 27.8 |
| 0.15 | 274 | 27.0 |
| 0.175 | 250 | 23.1 |
| 0.20 | 215 | 20.3 |
| 0.25 | 194 | 14.5 |

Fraction 2 is very suitable for stabilisation of drinking yoghurt. The pectin stabilises the heat treated drink at about 0.175 wt % pectin. At this concentration the viscosity of the drink is down to a minimum of 20.4 cP.

Fraction 1 is also suitable for stabilisation of drinking yoghurt, but a somewhat higher amount (about 0.25%) of pectin is needed for stabilisation.

Example 19

Deesterification of Selected Pectin Fractions 19.1 Acidic Deesterification of a Selected First Pectin Fraction 30 g of the selected first pectin fraction from Example 17 was deesterified (at pH 0.9) substantially as described in Example 7 with the exception that the reaction was carried out for 6 hours to give 29.4 g of a deesterified pectin. The analytical characteristics of the recovered pectin are shown in the below Table 19.1.

19.2 Acidic Deesterification of a Selected Second Pectin Fraction 30 g of the selected second pectin fraction from Example 17 was deesterified (at pH 0.8) substantially as described in Example 7 with the exception that the reaction was carried out at a temperature of 53° C. for 5 hours to give 29.7 g of a deesterified pectin. The analytical characteristics of the recovered pectin are shown in the below Table 19.1.

TABLE 19.1

Deesterified pectin products

|  | Example 19.1 | Example 19.2 |
| --- | --- | --- |
| Degree of esterification (%) | 65.7 | 59.4 |
| % AUA | 83.9 | 80.9 |
| US SAG° | 224 | 239 |
| Visc° | 53.0 | 63.9 |
| Setting time (sec) | 248 | 320 |

What is claimed is:

1. A method of obtaining selected pectin fractions having successively increasing setting times, the method comprising subjecting a starting material comprising high-esterified pectin to a first treatment cycle comprising a step of extracting the starting material with an aqueous extraction medium at an acidic pH under conditions where only a part of the pectin content is extracted, separating a pectin extract from the treated starting material and recovering the pectin from the pectin extract to obtain a first pectin fraction, followed by at least one further treatment cycle whereby the treated starting material extracted in a preceding treatment cycle is extracted with an aqueous extraction medium under conditions where at least a part of the pectin content is extracted from the treated starting material extracted in a preceding treatment cycle and recovering the pectin from at least a second pectin extract to obtain at least a second pectin fraction, the pH of the aqueous extraction medium in the at least one further treatment cycle being lower than in the immediately preceding treatment cycle, said at least second pectin fraction being separate from said first pectin fraction.

2. A method according to claim 1 wherein the starting material comprising high-esterified pectin is a pectin-containing material which has been subjected to a pre-treatment.

3. A method according to claim 1 wherein the pH of the aqueous extraction medium in each treatment cycle is in the range of 1 to 4.

4. A method according to claim 1 wherein the starting material comprising high-esterified pectin is derived from a native vegetable material in a fresh or dried state.

5. A method according to claim 1 wherein the starting material comprising high-esterified pectin is the solid extraction residue from a preceding treatment cycle.

6. A method according to claim 1 wherein the extraction in each treatment cycle is carried out at a temperature in the range of from 40° C. to 100° C. for a period of time of from 1 to 20 hours.

7. A method according to claim 1 wherein the starting material comprising high esterified pectin or the treated starting material extracted in a preceding treatment cycle is present in each respective treatment cycle at a dry matter content in the range of from 1% to 5% by weight, based on the total amount of the starting material comprising high esterified pectin or the treated starting material extracted in a preceding treatment cycle and the aqueous extraction medium.

8. A method according to claim 1 wherein the aqueous extraction medium in each treatment cycle comprises an added water soluble salt selected from the group consisting of calcium, aluminum and a mixture of calcium and aluminum in an amount which corresponds to a metal ion concentration in the range of from 10 mmol to 40 mmol per liter of the aqueous extraction medium.

9. A method according to claim 1 wherein the pectin is recovered from the pectin extract of any of the treatment cycles by precipitation with a water-miscible organic solvent in which the pectin is substantially insoluble, separating the precipitated pectin from the liquids and drying the separated pectin.

10. A method according to claim 1 wherein the pectin is recovered from the pectin extract of any of the treatment cycles by adjusting the pH of the pectin extract to a level in the range of 2 to 2.5, adding a strongly acidic cation exchange resin in a salt form to raise the pH to a level in the range of 2.5 to 3.5, stirring the mixture at ambient temperature for 4 to 8 hours, separating the liquid from the ion exchange resin, precipitating the pectin by addition of a water-miscible organic solvent, separating the precipitated pectin from the liquid, and drying the separated pectin.

11. A method according to claim 2 wherein the pre-treatment comprises heating a suspension of the starting material comprising high-esterified pectin at a temperature of from 60° C. to 80° C. in a substantially homogeneous solvent mixture comprising water and at least one water-miscible organic solvent in which the pectin is substantially insoluble, to which an acid is added to maintain a fixed pH of the suspension within the range of from 1 to 3 during the pre-treatment and separating the pre-treated pectin-containing starting material.

12. A method according to claim 11 wherein the weight ratio between the solvent and the water in the pre-treatment mixture is from 40:60 to 80:20, the amount of the water being the sum of added water and water present in the starting material comprising high-esterified pectin prior to the pre-treatment.

13. A method according to claim 11 wherein the starting material comprising high-esterified pectin is pretreated for a period of from 2 to 6 hours.

14. A method according to claim 11 wherein the pre-treated pectin-containing starting material is subjected to at least one washing step.

15. A method according to claim 11 wherein the pre-treated pectin-containing starting material is dried to obtain a dry matter content in the material of at least 80% by weight.

16. A method according to claim 15 wherein the pre-treated pectin-containing starting material is dried at a temperature in the range of from ambient temperature to 100° C. for a period of up to 36 hours.

17. A method according to claim 1 wherein said at least one further treatment cycle comprises several treatment cycles, each of said several treatment cycles producing a separate pectin fraction, the pH of the aqueous extraction medium in each of the several treatment cycles being lower than in the immediately preceding treatment cycle.

18. A method according to claim 1 wherein the starting material comprising high esterified pectin or the treated starting material extracted in a preceding treatment cycle is present in each respective treatment cycle at a dry matter content in the range of from 2% to 4% by weight, based on the total amount of the starting material comprising high esterified pectin or the treated starting material extracted in a preceding treatment cycle and the aqueous extraction medium.

19. A method according to claim 11, wherein the starting material comprising high-esterified pectin is pre-treated for a period of from 3 to 4 hours.

20. A method of preparing a food product comprising the step of including in the food product at least one selected pectin fraction having a degree of esterification which is at least 50% and a setting time which is in a range of 0 to 100 sec, 101 to 200 sec, 201 to 300 sec, or in excess of 300 sec, wherein the at least one selected pectin fraction is selected from the group consisting of a first pectin fraction, an at least one second pectin fraction, or a mixture thereof obtainable by a process comprising:

subjecting a starting material including high-esterified pectin to a first treatment cycle comprising a step of extracting the starting material with an aqueous extraction medium at an acidic pH under conditions where only a part of the pectin content is extracted, separating a pectin extract from the treated starting material and recovering the pectin from the pectin extract to obtain the first pectin fraction, followed by at least one further treatment cycle whereby the treated starting material extracted in a preceding treatment cycle is extracted with an aqueous extraction medium under conditions where at least a part of the pectin content is extracted from the treated starting material extracted in a preceding treatment cycle and recovering the pectin from an at least one second pectin extract to obtain the at least one second pectin fraction, the pH of the aqueous extraction medium in the at least one further treatment cycle being lower than in the immediately preceding treatment cycle, said at least one second pectin fraction being separate from said first pectin fraction.

21. A method according to claim 20 wherein the food product is an acidified milk product having a pH of 3.5 to 4.5.

22. A method according to claim 20 wherein the food product is a preserve.

23. A method of stabilizing an acidified milk product comprising the step of adding to the milk product an amount of at least one selected pectin fraction having a degree of esterification which is at least 50% and a setting time which is in the range of 0 to 100 sec, 101 to 200 sec, 201 to 300 sec or in excess of 300 sec, wherein the at least one selected pectin fraction is selected from the group consisting of a first pectin fraction, an at least one second pectin fraction, or a mixture thereof obtainable by a process comprising:

subjecting a starting material including high-esterified pectin to a first treatment cycle comprising a step of extracting the starting material with an aqueous extraction medium at an acidic pH under conditions where only a part of the pectin content is extracted, separating a pectin extract from the treated starting material and recovering the pectin from the pectin extract to obtain the first pectin fraction, followed by at least one further treatment cycle whereby the treated starting material extracted in a preceding treatment cycle is extracted with an aqueous extraction medium under conditions where at least a part of the pectin content is extracted from the treated starting material extracted in a preceding treatment cycle and recovering the pectin from an at least one second pectin extract to obtain the at least one second pectin fraction, the pH of the aqueous extraction medium in the at least one further treatment cycle being lower than in the immediately preceding treatment cycle, said at least one second pectin fraction being separate from said first pectin fraction;

the addition of the at least one selected pectin fraction resulting in an improvement of the milk product, wherein the improvement is selected from the group consisting of at least 10% reduction in viscosity, at least 10% smaller particles, at least 10% less sediment, at least 2 times reduction in viscosity, at least 2 times smaller particles and at least 2 times less sediment, as compared to the addition of the same amount of a bulk-extracted pectin product.

24. A method of obtaining a deesterified pectin fraction, comprising subjecting a selected pectin fraction obtainable by the method of claim 1 and having a degree of esterification which is 50% or higher, to at least one deesterification treatment step comprising treating the selected pectin fraction with a deesterifying agent to obtain a deesterified pectin fraction having a degree of esterification (DE) which is reduced by at least 5% relative to that of the selected pectin fraction, and a degree of amidation (DA) which is in the range of 0–25.

25. A method according to claim 24 wherein the deesterified pectin fraction having a DE which is reduced by at least 5% relative to that of the selected pectin fraction is used as a starting material in a further step of deesterification.

26. A method according to claim 24 wherein the deesterified pectin fraction has a DE which is at the most 70%.

27. A method according to claim 26 wherein the deesterified pectin fraction has a DE which is in the range of 20–45%.

28. A method according to claim 24, wherein the deesterifying agent is selected from the group consisting of an acid and ammonia.

29. A method according to claim 28 wherein the at least one deesterification treatment step comprises heat treatment of the selected pectin fraction in an aqueous solution or suspension in the presence of an acid to give a pH of at the most 1.

30. A method according to claim 28, wherein the deesterification occurs in a deesterification treatment mixture including a content of pectin dry matter which is in the range of from 1 to 5% by weight.

31. A method according to claim 28 wherein the deesterification occurs in a deesterification treatment mixture and the deesterified pectin fraction is recovered from the deesterification treatment mixture by adjusting the pH of the deesterification treatment mixture to a value in the range of from 3 to 5 by the addition of a base, followed by precipitation of the deesterified pectin fraction in a water-miscible organic solvent or into a homogeneous solution of a water-miscible organic solvent and water, and separating the precipitated deesterified pectin fraction.

32. A method according to claim 24 wherein the deesterified pectin fraction has a degree of amidation which is in the range of from 5 to 25.

33. A method according to claim 24 wherein the ratio between the degree of esterification and the degree of amidation in the deesterified pectin fraction is at least 0.75.

34. A method of obtaining a deesterified pectin fraction, comprising subjecting a starting material selected from the group consisting of a selected pectin fraction obtainable by the method of claim 1 and having a degree of esterification which is 50% or higher, and a selected deesterified pectin fraction obtainable by the method of claim 24, to at least one deesterification treatment step comprising treating the starting material with a deesterifying agent to obtain a deesterified pectin fraction having a degree of esterification (DE) which is reduced by at least 5% relative to that of the starting material, and a degree of amidation (DA) which is in the range of 0–25, wherein the at least one deesterification treatment step is carried out in a suspension comprising said starting material and an aqueous solution comprising a water-miscible organic solvent and ammonia.

35. A method according to claim 34 wherein the amount of pectin dry matter in the suspension is in the range of 10 to 30 wt % of the suspension.

36. A deesterified pectin fraction obtainable by the method of claim 24, the fraction having a degree of esterification which is less than 50% and a degree of amidation which is in the range of 0 to 25.

37. A deesterified pectin fraction according to claim 36 having a degree of esterification which is at the most 45%.

38. A deesterified pectin fraction according to claim 36 or 37 which has a degree of amidation which is in the range of 5 to 25.

39. A deesterified pectin fraction according to claim 36 wherein the ratio between the degree of esterification and the degree of amidation in the deesterified pectin fraction is at least 0.75.

40. A method of preparing a food product comprising including a deesterified pectin fraction according to claim 36, 37 or 39 in the food product.

41. A method according to claim 24 wherein the deesterified pectin fraction has a DE of less than 60%.

42. A method according to claim 24 wherein the deesterified pectin fraction has a DE of less than 50%.

43. A method according to claim 24 wherein the deesterified pectin fraction has a DE of less than 45%.

44. A method according to claim 24 wherein the deesterified pectin fraction has a degree of amidation which is in the range of from 15 to 25.

45. A method according to claim 24 wherein the ratio between the degree of esterification and the degree of amidation in the deesterified pectin fraction is in the range of 0.75 to 2.0.

46. A method according to claim 24 wherein the ratio between the degree of esterification and the degree of amidation in the deesterified pectin fraction is in the range of 1 to 1.5.

47. A method according to claim 24 wherein the ratio between the degree of esterification and the degree of amidation in the deesterified pectin fraction is in the range of 1 to 1.2.

48. A deesterified pectin fraction according to claim 36 wherein the ratio between the degree of esterification and the degree of amidation in the deesterified pectin fraction is in the range of 0.75 to 2.00.

49. A deesterified pectin fraction according to claim 36 wherein the ratio between the degree of esterification and the degree of amidation in the deesterified pectin fraction is in the range of 1.0 to 1.5.

50. A deesterified pectin fraction according to claim 36 wherein the ratio between the degree of esterification and the degree of amidation in the deesterified pectin fraction is in the range of 1.0 to 1.2.

51. A deesterified pectin fraction according to claim 36 having a degree of esterification which is at the most 40%.

* * * * *